United States Patent
Bhaskaran et al.

(10) Patent No.: US 10,068,606 B2
(45) Date of Patent: Sep. 4, 2018

(54) OPTICAL DEVICE

(71) Applicant: OXFORD UNIVERSITY INNOVATION LIMITED, Oxford (GB)

(72) Inventors: Harish Bhaskaran, Oxford (GB); Peiman Hosseini, Oxford (GB); Carlos Andres Rios-Ocampo, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 15/107,191

(22) PCT Filed: Dec. 22, 2014

(86) PCT No.: PCT/GB2014/053826
§ 371 (c)(1),
(2) Date: Jun. 22, 2016

(87) PCT Pub. No.: WO2015/097469
PCT Pub. Date: Jul. 2, 2015

(65) Prior Publication Data
US 2016/0336036 A1 Nov. 17, 2016

(30) Foreign Application Priority Data

Dec. 23, 2013 (GB) .................................. 1322912.5
Oct. 10, 2014 (GB) .................................. 1417976.6

(51) Int. Cl.
*G11B 7/24* (2013.01)
*G11B 7/257* (2013.01)
(Continued)

(52) U.S. Cl.
CPC .............. *G11B 7/257* (2013.01); *G11B 7/243* (2013.01); *G11B 7/24038* (2013.01); *G11B 7/24056* (2013.01); *G11B 7/24062* (2013.01)

(58) Field of Classification Search
None
See application file for complete search history.

(56) References Cited

U.S. PATENT DOCUMENTS 5,346,740 A     9/1994  Ohno et al.
5,549,953 A *   8/1996  Li ........................ G02B 5/285
                                                          369/283

(Continued)

FOREIGN PATENT DOCUMENTS

EP     0779614 A1    6/1997
EP     1571658 A2    9/2005

(Continued)

OTHER PUBLICATIONS

International Search Report and Written Opinion prepared by the European Patent Office dated Feb. 24, 2015, for International Application No. PCT/GB2014/053826.

(Continued)

*Primary Examiner* — Elizabeth Evans Mulvaney
(74) *Attorney, Agent, or Firm* — Jason H. Vick; Sheridan Ross, PC

(57) ABSTRACT

An optical device, such as an optical storage medium, comprises a layer of material in the solid state that has a refractive index that is switchable between at least two stable values by applied light. A reflector is spaced apart from the layer of material by a solid spacer layer transmissive to light.

17 Claims, 3 Drawing Sheets

(51) Int. Cl.
*G11B 7/24038* (2013.01)
*G11B 7/243* (2013.01)
*G11B 7/24056* (2013.01)
*G11B 7/24062* (2013.01)

(56) References Cited

U.S. PATENT DOCUMENTS

| | | | |
|---|---|---|---|
| 5,709,978 A | 1/1998 | Hirotsune et al. | |
| 6,819,469 B1 | 11/2004 | Koba | |
| 8,917,440 B2 | 12/2014 | Kim et al. | |
| 2003/0001943 A1 | 1/2003 | Hirotsune et al. | |
| 2005/0157630 A1* | 7/2005 | Yeh | B82Y 30/00 369/275.2 |
| 2006/0062128 A1* | 3/2006 | Mijiritskii | G11B 7/243 369/125 |
| 2006/0119774 A1 | 6/2006 | Chen | |
| 2007/0247513 A1 | 10/2007 | Hirotsune | |
| 2010/0151178 A1 | 6/2010 | Sakaue et al. | |
| 2010/0157769 A1 | 6/2010 | Knappmann et al. | |
| 2010/0225989 A1 | 9/2010 | Anders | |
| 2010/0279053 A1 | 11/2010 | Tsuchino et al. | |
| 2015/0098032 A1 | 4/2015 | Park | |

FOREIGN PATENT DOCUMENTS

| | | |
|---|---|---|
| EP | 2 196 993 A1 | 6/2010 |
| EP | 2 202 740 A1 | 6/2010 |
| EP | 2196993 A1 | 6/2010 |
| EP | 2202740 A1 | 6/2010 |
| JP | 2002-150605 | 5/2002 |
| JP | 2002-150613 | 5/2002 |
| JP | 2003-016649 | 1/2003 |
| JP | 2003-100084 | 4/2003 |
| JP | 2003-291534 | 10/2003 |
| JP | 2004-203011 | 7/2004 |
| JP | 2004-268587 | 9/2004 |
| JP | 2005-174423 A | 6/2005 |
| JP | 2007-294012 | 11/2007 |
| JP | 2009-086060 A | 4/2009 |
| JP | 2012-235144 | 11/2012 |
| WO | WO 02/099796 | 12/2002 |
| WO | WO 2006/051996 | 5/2006 |
| WO | WO 2007/013276 | 2/2007 |
| WO | WO 2010/052842 | 5/2010 |

OTHER PUBLICATIONS

Kats, Mikhail A. et al. "Nanometre Optical Coatings Based on Strong Interference Effects in Highly Absorbing Media" Letters—Nature Materials; vol. 12; Jan. 2013.

Kats, Mikhail A et al. "Ultra-Thin Perfect Absorber Employing a Tunable Phase Change Material" Applied Physics Letters 101, 221101; 2012.

Notification of Reasons (including translation) for Refusal for corresponding Japanese Patent Application No. 2016-542234, dated May 8, 2018.

* cited by examiner

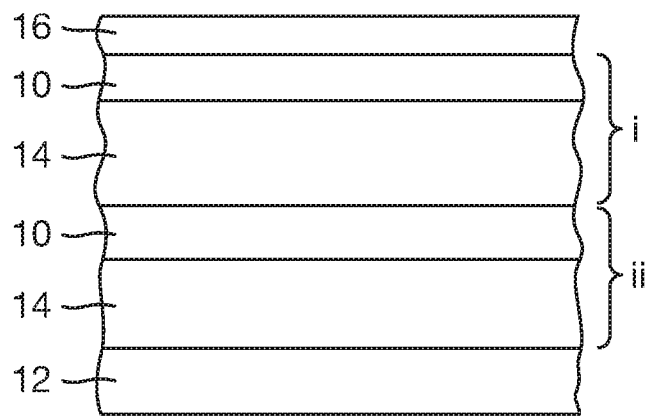
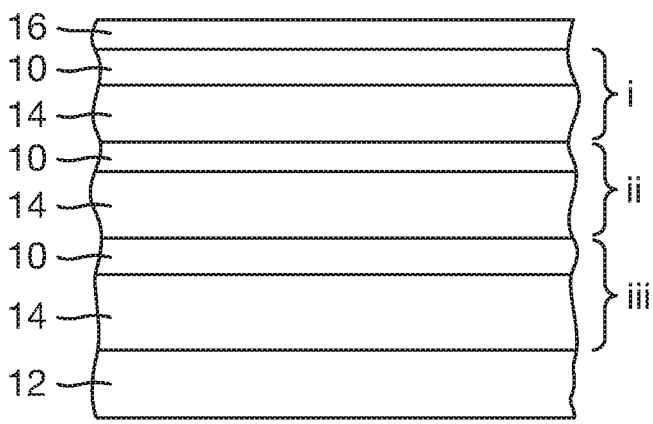

OPTICAL DEVICE

CROSS REFERENCE TO RELATED APPLICATIONS

This application is a national stage application under 35 U.S.C. 371 and claims the benefit of PCT Application No. PCT/GB2014/053826 having an international filing date of 22 Dec. 2014, which designated the United States, which PCT application claimed the benefit of Great Britain Application No. 1322912.5 filed 23 Dec. 2013 and Great Britain Application No. 1417976.6 filed 10 Oct. 2014, the disclosures of each of which are incorporated herein by reference.

The present invention relates to an optical device with applications in various fields, such as optical storage media, optical security marks, and optical force sensors.

There have been considerable developments in optical storage media, for example CD, DVD, and Blu-ray. To increase the storage density and hence storage capacity of these media, manufacturers have concentrated on the size of the 'bit' i.e. the spot or area of the medium used to record each piece of information. Hence the move to shorter wavelength light for recording or reproducing information, such as 405 nm for Blu-ray. Rewritable (RW) versions of these media are available that use a phase change material (PCM) that can be switched between phases that have different reflectivities to represent different states for recording bits of information.

However, with rewritable media technology, there is the problem that the change in reflectivity between phases is quite small, such as 30%, so that as the area per bit is reduced, the signal to noise ratio (SNR) of the playback signal also decreases, so it becomes harder to read the stored information reliably. Storage density on these media is at a limit at the moment.

It is also desirable to reduce the amount of PCM used in the optical storage media because it is relatively expensive. However, there is the problem that using less PCM also reduces the reflectivity contrast between the two phases, so decreases the playback signal to noise ratio.

In other fields, there is also a desire to provide security marks that are more difficult to detect, more difficult to forge, and that may be rewritable.

The present invention has been devised in view of the above problems.

Accordingly, the present invention provides an optical device comprising:

a layer of material in the solid state that modifies the reflectivity of the device; and a reflector, wherein the reflector is spaced apart from the layer of material by a solid spacer layer transmissive to light.

There is also provided an optical storage medium, a security mark, a force sensor, or a decorative item comprising an optical device according to the invention.

The invention also provides a recording apparatus and a reproducing apparatus.

Further optional aspects are defined in the dependent claims.

Throughout this specification, the terms 'optical' and 'light' are used, because they are the usual terms in the art relating to electromagnetic radiation, but it is understood that in the context of the present specification they are not limited to visible light. It is envisaged that the invention can also be used with wavelengths outside the visible spectrum, such as infrared and ultraviolet light.

Embodiments of the invention will now be described, by way of example only, with reference to the accompanying drawings in which.

Figure 1:
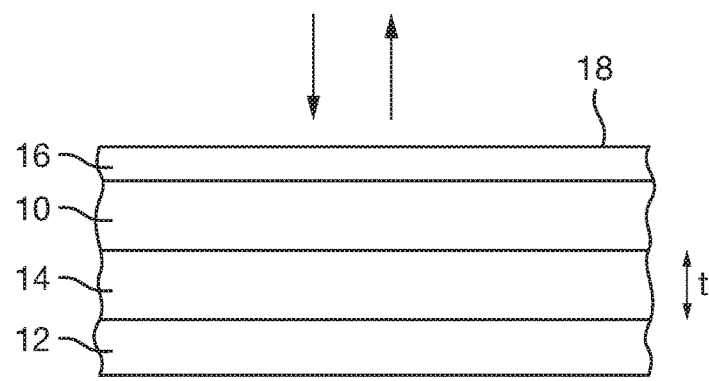
FIG. 1 is a schematic cross-section of a portion of an optical device according to an embodiment of the invention.

FIG. 5 is a schematic cross-section of a portion of an optical device according to a further embodiment of the invention; and FIG. 6 is a schematic cross-section of a portion of an optical device according to another embodiment of the invention A first embodiment of an optical device that will be described is an optical storage medium. The optical storage medium will be described with reference to FIG. 1, which shows a layered structure in cross-sections. A portion of solid state material 10 is provided in the form of a layer. The material of this layer has a refractive index that is permanently, yet reversibly, changeable by the application of a light pulse. Such a material, also known as a phase change material (PCM), undergoes a drastic change in both the real and imaginary refractive index when switched between amorphous and crystalline phases. In the present preferred embodiment, the material is $Ge_2Sb_2Te_5$ (GST).

The portion of material 10 is provided on a reflector 12, which in this embodiment is a layer of metal such as platinum or aluminium. A spacer layer 14 is sandwiched between the material 10 and the reflector 12. A capping layer 16 is provided on top of the material layer 10. In this particular embodiment, the upper surface 18 of the capping layer 16 constitutes the optical access surface of the recording medium, and the reflector 12 is a back-reflector. Light enters and leaves through the access surface 18, as indicated by the arrows in FIG. 1. However, because of interference effects dependent on the refractive index of the material layer 10 and the thickness of the spacer 14, the reflectivity varies significantly as a function of wavelengths of light, as will be illustrated further below.

The spacer 14 and the capping layer 16 are both optically transmissive, and are ideally as transparent as possible. In the following examples, the spacer 14 and the capping layer 16 are made of indium tin oxide (ITO), but it is not necessary for them to be electrically conductive, nor to be made of the same material. Other suitable materials include $SiO_2$—ZnS, and polymeric materials, but any solid transparent or semi-transparent material could be used.

The whole structure shown in FIG. 1 can be provided on a substrate (not shown) such as a glass or plastics material, for example a polycarbonate disc approximately 1 mm thick. The layers are deposited using sputtering in the case of inorganic material layers such as the phase change material 10, ITO, $SiO_2$, and so on, which can be performed at a relatively low temperature of 100 Celsius. Polymeric layers can be formed by spin-coating and curing. Additional layers may also be provided for the recording medium as necessary.

In the preferred embodiment, the material layer 10, composed of GST, is less than 100 nm thick, and preferably less than 10 nm thick, such as 6 or 7 nm thick. The spacer layer 14 has a thickness typically in the range from 10 nm to 250 nm, depending on the wavelength and optical properties required, as discussed below. The capping layer 16 is, for example, 20 nm thick. The reflector in one example is 100 nm thick. The material of the layer 10, in this embodiment GST, can undergo an induced reversible phase change. It is deposited in the amorphous state. A light pulse from a laser light source can heat a small portion of the material to cause it to crystallize and hence write information that contrasts with the amorphous portions. A higher intensity and quicker light pulse is used to momentarily melt the material and quench it back to the amorphous phase. It is also possible, when manufacturing the recording medium, to treat it, such as thermally, so that the phase change material of the layer 10 is initially fully crystalline (polycrystalline); information is then written by a light beam that converts portions of the material to the amorphous phase.

As previously explained, there is a substantial change in the refractive index when the material is switched between amorphous and crystalline phases. The material is stable in either state. Switching can be performed an effectively limitless number of times. However, it is not essential that the switching is reversible; for example, a change that cannot readily be reversed can be used to produce a 'write-once' recording medium.

Figure 2:
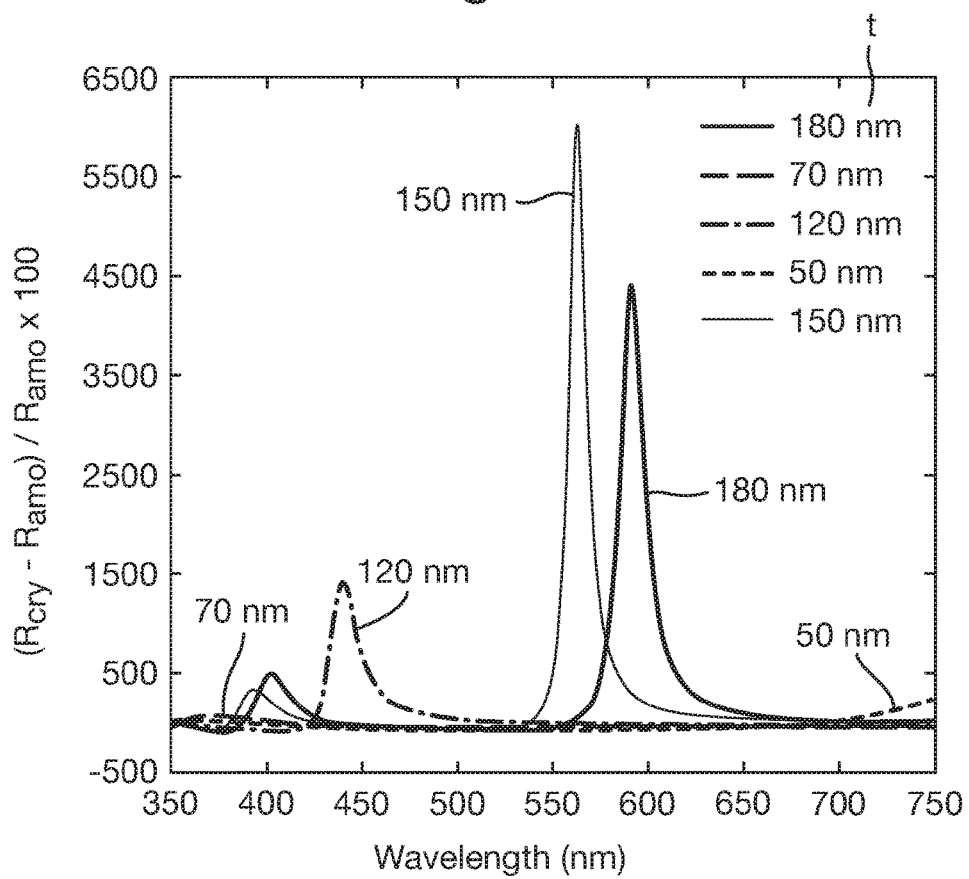
FIG. 2 shows plots of the percentage change in reflectivity against wavelength for several different thicknesses of the transmissive spacer layer of a recording medium according to an embodiment of the invention.
Figure 3:
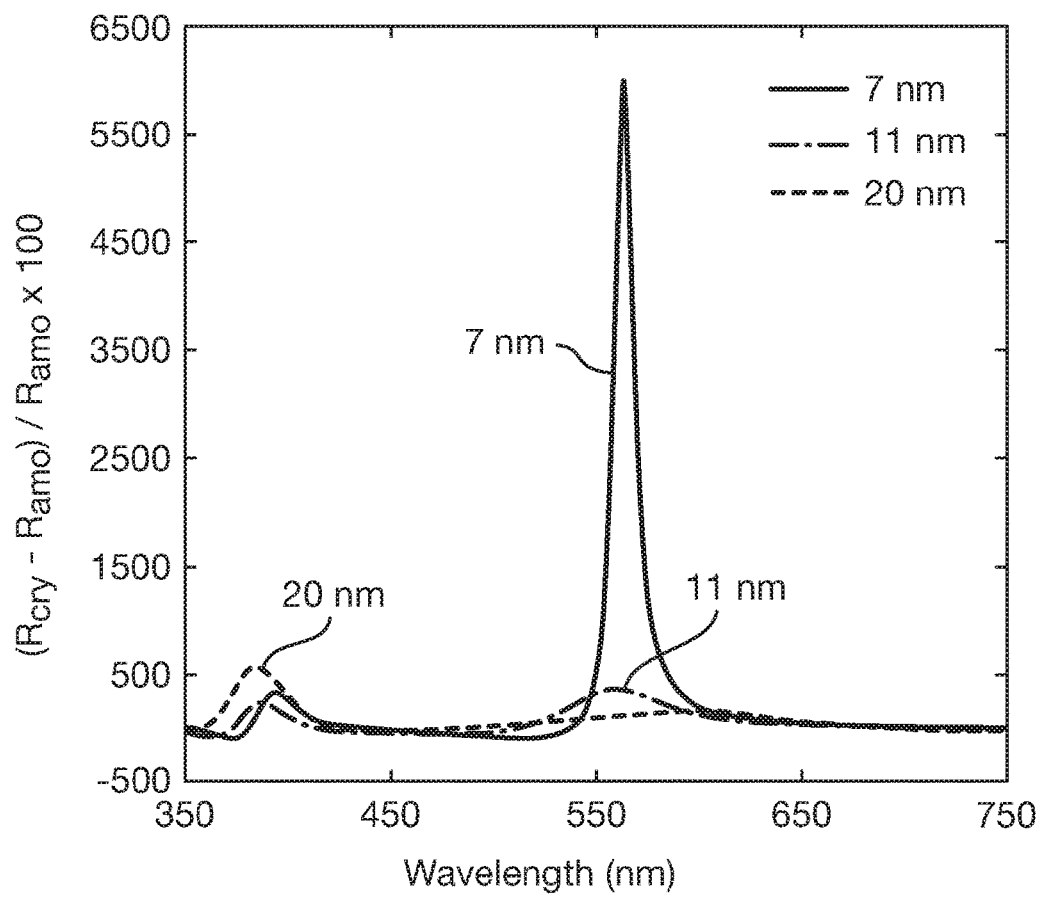
FIG. 3 shows plots of the percentage change in reflectivity against wavelength for several different thicknesses of the phase change material layer of a recording medium according to an embodiment of the invention.

FIGS. 2 and 3 are the results for a number of exemplary stacks of layers for a recording medium, comprising a 20 nm thick ITO capping layer 16, a GST phase change material layer 10, an ITO spacer layer 14, and a 100 nm platinum reflector 12, all on a $SiO_2$ substrate. FIG. 2 shows the percentage change in optical reflectivity between the crystalline and amorphous states of the layer 10, (Rcry−Ramo)× 100/Ramo, where Rcry and Ramo are the reflectivites of the medium when the material layer 10 is in the crystalline and amorphous states, respectively. The change in optical reflectivity effectively gives a measure of the observable contrast between the two states for each wavelength. The plots are spectra and show the response for a number of different thicknesses t of the spacer layer 14, in this case for five samples with spacer thickness ranging from 50 nm to 180 nm; in all cases the GST layer 10 is 7 nm thick. As can be seen, very large modulation in the reflectivity can be obtained at particular wavelengths, selectable by the choice of thickness of the spacer layer 14. The combination of thickness of the spacer layer and wavelength of the light used to sense the reflectivity are selected to provide large contrast, for example, for a reading laser of wavelength around 560 nm, the spacer layer thickness for these materials is made around 150 nm thick. Thus there is excellent contrast between 'light' and 'dark' spots recorded on the medium.

FIG. 3 shows the percentage change in optical reflectivity between the crystalline and amorphous states of the layer 10 for examples with three different thicknesses of the GST layer, 20 nm, 11 nm and 7 nm. In each case the spacer layer is 150 nm thick. As can be seen, there is a tremendous contrast in reflectivity between about 560 and 570 nm for a 7 nm thick GST layer, but this is severely reduced for thicker GST films. So in this case using less phase change material than is used conventionally enhances the optical performance.

A further enhancement applicable to all embodiments is that the material of the layer 10 does not have to be switched simply between a fully crystalline and a fully amorphous state. A mixture of phases can be achieved, such as 20% crystalline, 40% crystalline etc. Partial crystallisation is achieved by simply limiting the maximum light intensity and pulse duration during switching. The resulting effective refractive index of the material is somewhere between the two extremes of fully crystalline and fully amorphous depending on the degree of partial crystallisation. Between 4 and 8 distinct mixed phases can be readily achieved, having the corresponding number of different detectable reflectivities, but with appropriate control, the number can be much higher, such as 128. Using 8 discrete levels of reflectivity means that each spot or portion on the recording medium can record 4 bits of information (2 levels per bit), and therefore the recording density is 4 times greater than using just two reflectivities (amorphous and crystalline) for each spot or bit. Greater numbers of levels provide correspondingly higher recording densities.

Figure 4:
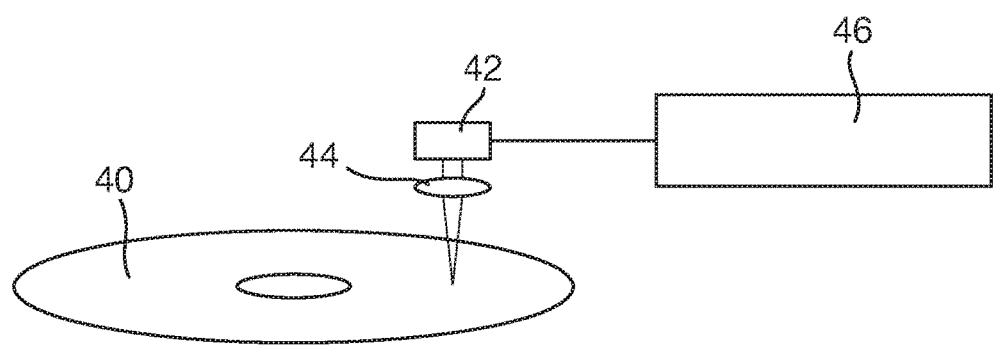
FIG. 4 is a schematic illustration of a recording/reproducing apparatus according to an embodiment of the invention.

FIG. 4 shows a schematic illustration of a recording/reproducing apparatus using an optical recording medium according to an embodiment of the present invention. In this case, the recording medium is in the form of a disc 40. A light source 42 and associated optical components 44 are arranged to focus a spot of light onto the disc 40. In this illustration, the layers of the recording medium are as shown in FIG. 1, with the optical access surface 18 being the upper surface of the disc 40; however, the layers and disc could be reversed with optical access being from underneath the disc 40.

A controller 46 is provided to control a motor and spindle (not shown) to rotate the disc 40 about its axis, and to control an actuator (not shown) to move the light source 40 and optics 44 radially across the disc, to access any part of the disc. Feedback control, as is known in the art, is used to control the rotational speed of the disc and to set the focus of the optics 44 on to the recording medium. If multiple phase change material layers are provided on the same disc, to provide multi-layer recording, then the controller 46 can also adjust the optics 44 to focus on a required layer.

The light source 42 comprises, for example, a laser diode that emits substantially monochromatic light with a wavelength corresponding to that of a substantial change in reflectivity between the crystalline and amorphous phase of the phase change material layer 10 of the particular recording medium (see FIGS. 2 and 3). For reading data from the disc, the intensity of the light source is controlled to be below the threshold for affecting the phase of the phase change material layer 10. The apparatus comprises further optics (not shown), such as a beam splitter and light detector, to sense the light reflected off the disc 40 as the disc 40 is rotated and probed with light from the light source 42. A signal from the detector is passed to the controller 46 where it is subjected to signal processing as known in the art to obtain an output of the information recorded on the disc.

The disc 40 can be provided with a continuous uniform layer 10 of phase change material, or the material may be deposited only on specific regions or tracks or may be patterned into particular tracks to assist reading and recording from the disc. Optionally, additional marks may be provided, such as pits or ridges, pre-defined in the substrate of the disc 40 to define tracks to assist the controller 46 in guiding and positioning the optics 44 for reading and recording from the disc.

For recording information on the disc 40, the same light source 42 as used for reading can be used, but the output power is adjusted by the controller to effect the crystallization or partial crystallization or amorphous state of the phase change material of the layer 10 (and hence its refractive index), such that the resulting reflectivity values as the disc is moved relative to the optics 44 correspond to data to be written on the disc. The light power for recording is typically in the region of 10 mW. Alternatively, a different light source could be used for writing to the disc, and the writing light wavelength need not be the same as used for reading data from the disc.

It is, of course, understood that the pattern of reflectivity recorded on the storage medium need not correspond directly with the bits of original data, because the original data can be subjected to error-correction coding, run length limiting coding (e.g eight-to-fourteen modulation, EFM) and other techniques, as are well known in the art. When reading information from the storage medium, demodulation and decoding are performed, as appropriate, to recover the original data.

The preceding embodiments have been described with reference to GST ($Ge_2Sb_2Te_5$) as the phase change material of the layer 10, but this is not essential to the invention, and many other suitable materials are available, either separately or in combination, including compounds or alloys of the combinations of elements selected from the following list: GeSbTe, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb. It is also understood that various stoichiometric forms of these materials are possible; for example $Ge_xSb_yTe_z$; and another suitable material is $Ag_3In_4Sb_{76}Te_{17}$ (also known as AIST). Other suitable materials include any of the so-called "Mott memristors" (materials that undergo a metal-to-insulator transition, MIT, at some specific temperature), for example $VO_x$ or $NbO_x$. Furthermore, the material can comprise one or more dopants, such as C or N.

Optical recording media embodying the invention can be produced that have increased recording density, and better contrast for readability, but using conventional fabrication techniques.

Although the embodiments described herein mention that the material layer is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

The mechanism of switching is not limited to an applied light pulse from a laser, but could be any electromagnetic field induced heating from a laser or other source, or could be electric pulse induced heating (if integrated electrodes are provided for passing current through the material, which could be pixellated), or could be thermal heating for example using electrical resistive heating of an adjacent layer that is in thermal contact with the phase change material (an atomic-force microscope (AFM) tip could be used to scan the device and pass current to locally heat desired regions).

A further embodiment of an optical device is to provide one or more additional phase change material layers 10 and spacer layers 14 to the previously described structure to create a multilayer stack. Examples with two and three phase change material layers respectively are illustrated in FIGS. 5 and 6. As explained previously, the thickness of the spacer layer defines the peak wavelength in the reflectance spectrum of the stack (i.e. the central reflected color). By repeating alternating layers, as in this embodiment, the width of the reflectance peak can be reduced to make it more wavelength (color) specific. However, the absorption losses also increase as more layers are added, so the preferred number of phase change material layers is two or three.

In the multilayer stack optical device, the thicknesses of each of the layers can be selected separately from each other to engineer desired optical properties. For example, the thickness of each phase change material layer 10 determines the contrast in reflectivity between the different states or phases of the material 10 across the spectrum. Multiple colour combinations (reflectance spectra) can be obtained by separately switching/selecting the phase of each material layer. For example, in the case of two phase change material layers, four different apparent reflectance colors can be obtained by the combinations: Am-Am; Cry-Am; Am-Cry; and Cry-Cry (where the symbols Am=amorphous, and Cry=crystalline, and the pairs of symbols correspond to the two layers). Each of the multiple layers can be separately written to and read from by focusing a laser at a suitable depth in the stack It should be noted that in any of the above embodiments, when there is a switching of the phase of one or more layers 10, then there is a shift in the wavelength at which there is maximum reflectivity, and so an observable color change. However, the reflectivity contrast between wavelengths near the peak may not be particularly large. The biggest contrast (change in reflectivity as defined above) may be at wavelengths away from the peak, and this property can be utilised as described later.

A further property of any of the above-described embodiments is that the reflectance spectrum is a function of the light incidence angle and of the light polarization.

Applications

Optical devices according to any of the embodiments herein could be used as security marks, applied to articles, packaging, ID badges/passes, bank/credit cards and so forth. A pattern can be stored in the phase change material layer (or layers) by setting the crystallographic state of different regions. The pattern could simply be a recognisable image, or could encode specific information, such as being in the form of a bar code, QR code, or other suitable code. A pattern is not essential because one could just relying on the predetermined color change or spectral response intrinsic to the optical device that is difficult to replicate.

In one embodiment, the security mark is on a flexible substrate, such as a smart label or ID film, which can be bent to reveal a known change in color or to reveal a pattern to security personnel. The change in color and/or revelation of a pattern occurs because bending the device modifies the thickness of the layers, particularly the spacer layer, and so changes the spectral reflectivity response of the structure of, for example, FIG. 1.

In another embodiment, the mark is extremely small (even sub-micrometer scale), essentially undetectable to the naked-eye, and cannot be easily detected unless a special camera is used.

In a further embodiment, a pattern can be provided in the mark for which the contrast is small between the crystallographic states at most wavelengths, such that the pattern is invisible or hard to detect under general illumination, such as white light. However, the contrast can be large around one wavelength known by the security system, and so illuminating with light only at that wavelength can reveal the pattern. In general, the contrast as a function of wavelength and/or position can be used as a test of authenticity.

A further variant is when the mark is defined using a pattern of mott memristor, such as $VO_x$ or $NbO_x$, as the phase change material. A change in color contrast occurs when the mark is heated above the transition temperature, so the security mark can be revealed by heating the device, and the mark disappears when it cools down again.

In a device with multiple phase change material layers, different patterns can be recorded in the different layers as a further enhancement of security. For example, a high contrast pattern on an upper layer could occlude a pattern on a deeper layer, except when illuminated at a specific wavelength.

A device reader incorporating a simple spectrometer could assess the color variation of the mark at different angles (with or without bending) and compare that with a previously stored response to validate the authenticity of the mark (e.g. on a security card) with extremely high confidence.

Another device reader uses one or more low-power laser diodes to measure the reflectivity at fixed wavelength as a function of angle, and compares with a known response.

In the case of a pattern written into the mark, a device reader could include a camera to capture one or more images of the mark under particular illumination wavelengths or angles, and could employ contrast comparison and or image recognition to verify the mark.

With any of the security marks described above, the mark can, of course, be erased and/or rewritten using appropriate switching means, as previously described (such as laser, electric or thermal). This enables versatile security hierarchies, for example where the user's card is verified at a first checkpoint at which the device reader also writes second information to the mark. A second checkpoint then verifies that the second information is present and then erases and/or writes further information. In this way, the checkpoints can only be passed in sequence; and bypassing a checkpoint will cause access as subsequent checkpoints to be denied.

A different application of the optical device is as a force sensor. In this case, the layer of material 10 does not specifically have to be a phase change material, although it can be. The property of switching state is not used. The same is true of the security marks described above; if they are not required to be writable or rewritable, then they do not have to be phase change materials. The or each layer 10 is provided as an ultra-thin absorber layer, preferably less than 10 nm thick. Examples of suitable materials for the absorber include: any of the phase change materials previously mentioned; amorphous silicon, amorphous carbon, Ge, GaAs, InAs, InP, CdTe, $Ag_2S$, organic semiconductors; any suitable material that absorbs light and can be deposited into films a few nm thick (semiconductor materials are typically ideal for this). The stoichiometry can be changed and doping can be used to create the desired absorber properties. In fact, it is not necessary to use materials that absorb light in the bulk state; such materials can be engineered to create metamaterials that have the desired properties in terms of absorption.

The capping layer 16 can be anything transparent that protects the stack, such as $SiO_2$ or $AlO_2$. In one embodiment, the capping layer is 10 nm thick. The thickness t of the spacer 14 determines the peak reflectance wavelength and hence apparent color of the film. A multilayer structure as described above can be used to narrow the reflectance peak.

In the force sensor, when a force is applied to the layered device, the thickness t of the spacer 14 changes, which affects the apparent color of the device. The change in color is instantaneous, reversible (within the elastic boundaries of the material), and directly related to the applied force over a wide range. Therefore, the optical device provides a force sensor. To read the force, the color of the device is compared to calibrated colors (spectra) with known applied force. This can be done by eye, or with a simple camera, or with a more sophisticated spectrometer or reflectometer. The precision of the force measurement is defined by the quality of the optical measurement.

In the force sensor, the spacer 14 can be any optically tranmissive (ideally transparent) material that can be compressed by force to change thickness t and hence change color of the device. The elastic modulus of the material will dictate the sensitivity and working range of forces of the device. The material must work within its elastic regime, otherwise permanent deformation will alter the device characteristics and calibration. In the preferred embodiment, the spacer 14 is a soft material with high compressibility, such as an elastomer. Any substantially transparent elastomer is appropriate. One example is PMMA (polymethylmethacrylate); another example is any silicone, such as polydimethylsiloxane (PDMS). A typical thickness of the spacer 14 is in the range from 10 nm to 250 nm, for example 150 nm. In a multilayer device (as in FIGS. 5 and 6) one, some or all of the spacer layers 14 could be made of an elastomeric material. The spacer layers 14 can be of different materials from each other.

The optical device as a force sensor can be made as a thin film that can be applied to or printed on most surfaces, and is light and flexible. It is robust and cheap to manufacture. No electrical contact with the device is required in use because the force is read optically, so can be done remotely over arbitrary distances. The sensor can conform to the shape of complex objects. The sensor can be provided as a pixellated film, with the force at each point given by the color. For example, this device could be used in aerodynamic measurements to determine the pressure at desired points over the surface of a wing. If the area over which the force is applied is known, then the color change can be directly related to a pressure.

A further application of any of the devices described above is in decorative uses as a decorative item. For example, tiles or jewellery could be provided coated with the optical device. The color and pattern could be predetermined and/or could be changed subsequently.

The invention claimed is:

1. An optical device comprising:
a layer of material in a solid state that modifies a reflectivity of the device to provide a pattern comprising an image visibly recognizable by a human; and
a reflector,
wherein said material is a phase change material having a refractive index that is switchable between at least two stable values, and the pattern is defined by setting of the refractive index of different regions in the layer of material by switching of the phase change material in the different regions; and
wherein the reflector is configured to operate as a back-reflector with no other reflector being positioned between the reflector and an optical access surface through which light can enter and leave the device to provide the recognizable image, the reflector being spaced apart from the layer of material by a solid spacer layer transmissive to light, the solid spacer layer being positioned between the reflector and the optical access surface.

2. A device according to claim 1, wherein the refractive index of the material is switchable electrically, thermally or by applied light.

3. A device according to claim 1, wherein the refractive index of the material is reversibly switchable between at least two stable values.

4. A device according to claim 1, wherein the reflectivity of a portion of the device is settable at any one of at least three different values by switching the refractive index of the layer of material at that portion.

5. A device according to claim 1, wherein the material comprises a compound or alloy of a combination of elements selected from the following list of combinations: GeSbTe, $VO_x$, $NbO_x$, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb.

6. A device according to claim 5, wherein the material comprises a mixture of compounds or alloys of combinations of elements from said list.

7. A device according to claim 5, wherein said material further comprises at least one dopant, such as C or N.

8. A device according to claim 1, wherein the material comprises $Ge_2Sb_2Te_5$.

9. A device according to claim 1, wherein the layer of material is less than 20 nm thick, preferably less that 10 nm thick.

10. A device according to claim 1, wherein the layer of material is an optical absorber layer.

11. A device according to claim 1, wherein said spacer layer has a thickness in the range of from 10 nm to 250 nm.

12. A device according to claim 1, wherein said spacer layer comprises a compressible material, preferably an elastomeric material.

13. A device according to claim 1, comprising a plurality of pairs of layers, said pairs of layers each comprising a layer of material in the solid state that modifies the reflectivity of the device and a spacer layer, said pairs of layers being successively arranged in a stack.

14. A security mark or a decorative item comprising an optical device according to claim 1.

15. A device according to claim 1, further comprising integrated electrodes configured to pass current through the material.

16. A device according to claim 15, wherein the integrated electrodes are pixelated.

17. A device according to claim 1, further comprising a capping layer on top of the layer of material, wherein the spacer layer and the capping layer are made of indium tin oxide.

* * * * *